United States Patent
Nuber et al.

(10) Patent No.: US 12,025,803 B2
(45) Date of Patent: Jul. 2, 2024

(54) HEAD-MOUNTED DISPLAYS

(71) Applicant: Hewlett-Packard Development Company, L.P., Spring, TX (US)

(72) Inventors: Nathan Nuber, Fort Collins, CO (US); Robert P. Martin, Fort Collins, CO (US); Joseph Nouri, Fort Collins, CO (US); Louis M. Gaiot, Fort Collins, CO (US); Owen Richard, Fort Collins, CO (US); Eric Bokides, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 248 days.

(21) Appl. No.: 17/414,338

(22) PCT Filed: Jul. 31, 2019

(86) PCT No.: PCT/US2019/044325
§ 371 (c)(1),
(2) Date: Jun. 16, 2021

(87) PCT Pub. No.: WO2021/021155
PCT Pub. Date: Feb. 4, 2021

(65) Prior Publication Data
US 2022/0350144 A1    Nov. 3, 2022

(51) Int. Cl.
G02B 27/01    (2006.01)

(52) U.S. Cl.
CPC .... *G02B 27/0172* (2013.01); *G02B 2027/011* (2013.01); *G02B 2027/014* (2013.01)

(58) Field of Classification Search
CPC .......... G02B 27/0172; G02B 2027/011; G02B 2027/0123; G02B 27/0149; G02B 27/0176; G02B 2027/0156; G02B 2027/0154
See application file for complete search history.

(56) References Cited

U.S. PATENT DOCUMENTS

| | | |
|---|---|---|
| 7,501,996 B2 | 3/2009 | Schuette et al. |
| 8,028,350 B2 | 10/2011 | Hogen |
| 8,632,193 B2 | 1/2014 | Maurel |
| 8,800,067 B2 | 8/2014 | Saylor et al. |
| 9,470,906 B2 | 10/2016 | Kaji et al. |
| 9,472,025 B2 | 10/2016 | Thomas |
| 9,606,363 B2 | 3/2017 | Zalewski |
| 9,851,565 B1 | 12/2017 | Miao |
| 9,880,441 B1 | 1/2018 | Osterhout |
| 2010/0079356 A1 | 4/2010 | Hoellwarth |
| 2015/0253574 A1 | 9/2015 | Thurber |
| 2016/0062125 A1 | 3/2016 | Baek et al. |
| 2016/0062454 A1 | 3/2016 | Wang et al. |

(Continued)

FOREIGN PATENT DOCUMENTS

| | | |
|---|---|---|
| CN | 105388614 A | 3/2016 |
| CN | 105745569 A | 7/2016 |

(Continued)

*Primary Examiner* — Ryan D Howard
(74) *Attorney, Agent, or Firm* — Quarles & Brady LLP

(57) ABSTRACT

In an example implementation, a head-mounted display (HMD) device includes a display, a variable lens receptacle to receive an interchangeable lens, a sensor to retrieve lens information from the lens, and a controller to obtain images that are predistorted according to the lens information, wherein the controller is to display the predistorted images on the display.

20 Claims, 6 Drawing Sheets

(56) References Cited

U.S. PATENT DOCUMENTS

| | | |
|---|---|---|
| 2017/0329136 A1 | 11/2017 | Bates et al. |
| 2018/0124367 A1 | 5/2018 | Ishii |
| 2018/0157043 A1 | 6/2018 | Yi et al. |
| 2018/0246332 A1 | 8/2018 | Wang et al. |
| 2018/0246535 A1 | 8/2018 | Liu et al. |
| 2019/0056590 A1 | 2/2019 | Chuang et al. |
| 2019/0171023 A1 | 6/2019 | Carlvik et al. |
| 2019/0250409 A1 | 8/2019 | Stafford et al. |

FOREIGN PATENT DOCUMENTS

| | | |
|---|---|---|
| CN | 106104361 A | 11/2016 |
| CN | 107076989 A | 8/2017 |
| CN | 107466229 A | 12/2017 |
| CN | 108700740 A | 10/2018 |
| KR | 10-2016-0014507 A | 2/2016 |
| TW | 201606352 A | 2/2016 |
| WO | 95/24713 A1 | 9/1995 |
| WO | 2018/044584 A1 | 3/2018 |
| WO | 2018/126117 A2 | 7/2018 |
| WO | 2019/032611 A1 | 2/2019 |

HEAD-MOUNTED DISPLAYS

BACKGROUND

Head-mounted display (HMD) devices are display systems worn on a user's head that include an electronic display and optics to enable the user to experience video and other multimedia data being streamed or otherwise transmitted to the display. HMD devices allow users to immerse themselves in a wide variety of extended reality (XR) environments that can include, for example, virtual and augmented reality (VR, AR) experiences ranging from entertainment to real-world applications. HMD technology continues to evolve as the number of different applications and use scenarios for HMD devices continue to increase.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Figure 1A:
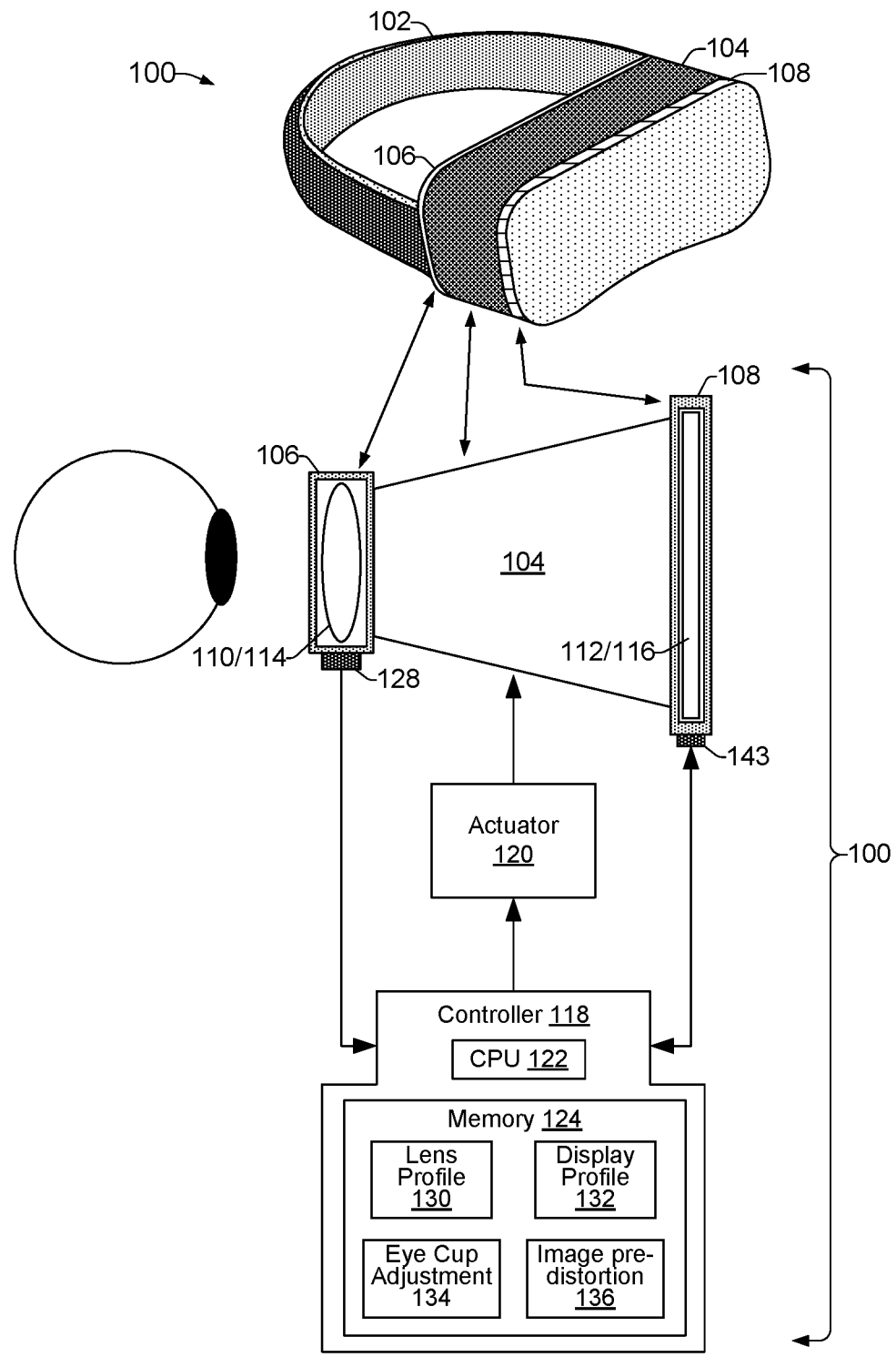
FIG. 1A shows a perspective view and block diagram view of an example head-mounted display (HMD) device suitable for implementing self-identifying, interchangeable lenses and displays to enable dynamic eye cup adjustment and device calibration.

Head-mounted display (HMD) technology continues to evolve as the number of different applications and use scenarios for HMD devices (also referred to as "headsets") continue to increase. The user experience can be optimized for a given HMD application or use scenario when the HMD device being used is produced with specific characteristics that are better suited for that application or scenario. Producing a variety of HMD devices with different characteristics suitable for particular applications, however, presents manufacturers with an ongoing challenge of reducing costs and commoditizing HMD devices.

Most head-mounted display (HMD) devices are manufactured with fixed eye cup designs that can accommodate a particular type of lens and display. While lens types can vary between different HMD device manufacturers, the types of lenses often used in HMD device designs are those with focal lengths that can provide good performance and a quality user experience over a range of applications. The eye cup geometry of an HMD device (e.g., the size of the eye cup opening, and/or distances between the lens, the display, and the user's eye) can be determined and constructed based on the type of lens (i.e., the focal length) selected for use in the device. Therefore, most HMD devices come assembled with fixed lenses and displays in a "one size fits all" approach.

Furthermore, each lens, regardless of its type (i.e., focal length), comprises its own "lens profile" that defines optical characteristics such as chromatic aberrations and lens distortion (e.g., pincushion distortion). The optical characteristics can be associated with, and they can vary between, different manufacturers, makes, models, materials, and so on. Accordingly, for most HMD devices that come assembled with a fixed lens as noted above, an imaging system incorporates the lens profile of the fixed lens into an image calibration process that applies pre-distortions to images prior to rendering the images to the HMD display. The applied image pre-distortions are then neutralized as the images pass through the fixed lens so the images look correct to the user's eye.

In some HMD devices, lenses can be replaced with corrective lenses that are designed for users who wear glasses. The corrective lens replacements create image artifacts such as the chromatic aberrations and distortion noted above, which can be corrected through a proper re-calibration. However, in such HMD devices, the imaging system is unaware that a lens has been replaced, and it is unable to apply the underlying lens profile associated with the replacement corrective lens. Therefore, re-calibration to correct for these image artifacts involves a tedious, manual re-calibration using the lens profile associated with the corrective lens. The manual re-calibration is often further complicated due to there being a different corrective lens for each of the user's eyes. Alleviating the artifacts therefore involves a distinct manual calibration for each lens.

In general, as the number of applications and use cases for HMD devices continue to grow, there is an increasing desire to be able to optimize the optical characteristics of HMD lenses and displays to better accommodate the various applications and use cases. For example, a user seeking to engage in a fully immersive VR simulation may want to maximize the field of view provided by the lenses and accept lower detail and crispness of the image. Conversely, someone who wants to work with text or perform product design evaluations on small objects may want to optimize lenses to improve image crispness and detail while sacrificing some of the peripheral field of view. Optimizing experiences in these different use cases may call for using different lens types (e.g., different focal length lenses) and adjusting eye cup geometries, as well as re-calibrations of the HMD device according to specific lens profiles in order to provide images on the display that have appropriate corrective pre-distortions.

In addition to optimizing lens performance, users may also want to optimize certain display screen characteristics to enhance their experience with a given HMD application or use case. For example, in a particular application a user may want the display screen to provide brighter images, while in another application the user may want a higher contrast ratio from the display. In the first case, optimizing the user experience with brighter images may involve using an HMD device assembled with an LCD display. In the second case, optimizing the user experience with a higher contrast ratio may involve using an HMD device assembled with an OLED display.

However, as noted above most headsets or HMD devices are currently assembled with a fixed pair of lenses and a fixed display panel. There is presently limited ability for first and third-party manufacturers to provide custom lens and display solutions to HMD device consumers. Consumers are often faced with limited options that primarily include frequently refreshing their HMD devices with new generation devices that include lens and display upgrades. An unfortunate consequence of this process is that previous generation HMD devices are often entirely disposed of when next generation devices are acquired.

Accordingly, an example head-mounted display (HMD) device and methods described herein implement self-identifying, interchangeable lenses and displays to enable dynamic eye cup adjustment and device calibration. In some examples, interchangeable lens and/or displays can provide self-identification through the HMD device to enable the device's imaging system to apply the correct calibration for the lens and/or displays. In some examples, interchangeable lens and displays can be configured as interchangeable 'modules', where the modules can store and provide lens and display self-identification information. A module can comprise a structure such as a frame in which a lens and/or display is housed or integrated. A module can comprise a particular form factor that corresponds with the form factor of a module receiver or receptacle of an HMD device. Identification information stored on a module can include and/or enable the HMD device to access calibration profiles that are associated with an inserted lens and/or display so that an imaging system can correct for distortion, chromatic aberration, projection and lens centering, and other factors when displaying images on the display. The identification information can also indicate a lens type (e.g., lens focal length) to enable a controller to make mechanical adjustments to the HMD eye cup shape based on the lens type.

The automatic calibration and mechanical adjustments enable users to implement different lenses having varying characteristics while maintaining a common HMD device platform. An example HMD device can include a variable lens and display receptacle that enables the insertion of lens and/or display modules containing different lenses and displays. A module can include stored identification information about an integrated lens or display, and the HMD device and/or receptacle can include a sensor to sense the identification information on the module, or the lens and display. A controller can use the identification information to determine a lens type and calibration profile, and can control mechanical adjustments to the HMD eye cup and make distortion adjustments to images prior to displaying images on the HMD display. An actuator can perform the mechanical adjustments based on geometric information from the controller, such as an applied distance between the lens at one end of the eye cup and a display panel at the opposite end of the eye cup.

In some examples, an HMD device includes a display, a variable lens receptacle to receive an interchangeable lens, a sensor to retrieve lens information from the lens, and a controller to obtain images that are pre-distorted according to the lens information, the controller to display the pre-distorted images on the display. The interchangeable lens can be housed in or integrated into a module having a form factor corresponding with the receptacle. In some examples, the lens information comprises a lens calibration profile, and obtaining the pre-distorted images comprises the controller applying image pre-distortions based on the lens calibration profile prior to displaying the pre-distorted images on the display.

In some examples, a method of operating an HMD device includes receiving a lens module in the HMD device, retrieving lens information from the lens module, determining a lens type and a lens profile from the lens information, adjusting the shape of the HMD device eye cup based on the lens type, and calibrating the HMD device imaging system based on the lens profile.

In some examples, a head-mounted display (HMD) device includes a lens receptacle to receive a self-identifying, interchangeable lens module, a reading device to retrieve lens identification information stored on the lens module when the lens module is inserted into the lens receptacle, and a controller to calibrate the HMD device based on the lens identification information.

FIG. 1A shows a perspective view and block diagram view of an example head-mounted display (HMD) device 100 suitable for implementing self-identifying, interchangeable lenses and displays to enable dynamic eye cup adjustment and device calibration. The example HMD device 100 includes a strap 102 or other attachment mechanism such as a helmet that enables a user to mount the device 100 on the user's head. The HMD device 100 also includes an eye cup 104 and lens and display receptacles 106, 108, positioned near opposite ends of the eye cup 104. The receptacles can comprise, for example, a frame structure with a particular form factor that enables the insertion of HMD device components having a corresponding form factor. Such components can include interchangeable lenses 110 and electronic displays 112, or corresponding modules containing interchangeable lenses and/or electronic displays for insertion into a receptacle 106 or 108. While lenses 110 and displays 112 are discussed and shown in the figures as being housed, packaged, or otherwise integrated within modules, other examples are possible, such as having the lenses and displays themselves manufactured with appropriate form factors for insertion into the HMD device receptacles 106 and 108.

As shown in FIG. 1A, an example HMD device 100 can also include a controller 118 and a mechanical actuator 120. An example controller 118 can include a processor (CPU) 122, memory 124, and other electronics (not shown) for communicating with and controlling components of the HMD device 100. A memory 124 can include both volatile and nonvolatile memory components comprising non-transitory, machine-readable (e.g., computer/processor-readable) media that can provide for the storage of machine-readable coded program instructions, data structures, program instruction modules, and other data and/or instructions executable by a processor 122 of the HMD device 100. Such instructions, data structures, and modules can include, for example, a lens profile 130, a display profile 132, an eye cup adjustment instruction module 134, and an image pre-distortion instruction module 136, which are discussed in more detail herein below.

The example HMD device 100 illustrated in FIG. 1A is configured as an "all-in-one" device. That is, the HMD device 100 shown in FIG. 1A not only operates as an image displaying device, but it also operates as an image processing device that processes images before they are displayed, for example, in accordance with a lens profile 130 and instructions from image pre-distortion module 136. In some examples of an "all-in-one" HMD device 100, images can be generated remotely and processed with pre-distortion on the HMD device 100. In other examples of an "all-in-one" HMD device 100, images can be both generated and processed with pre-distortion on the HMD device 100.

Figure 1B:
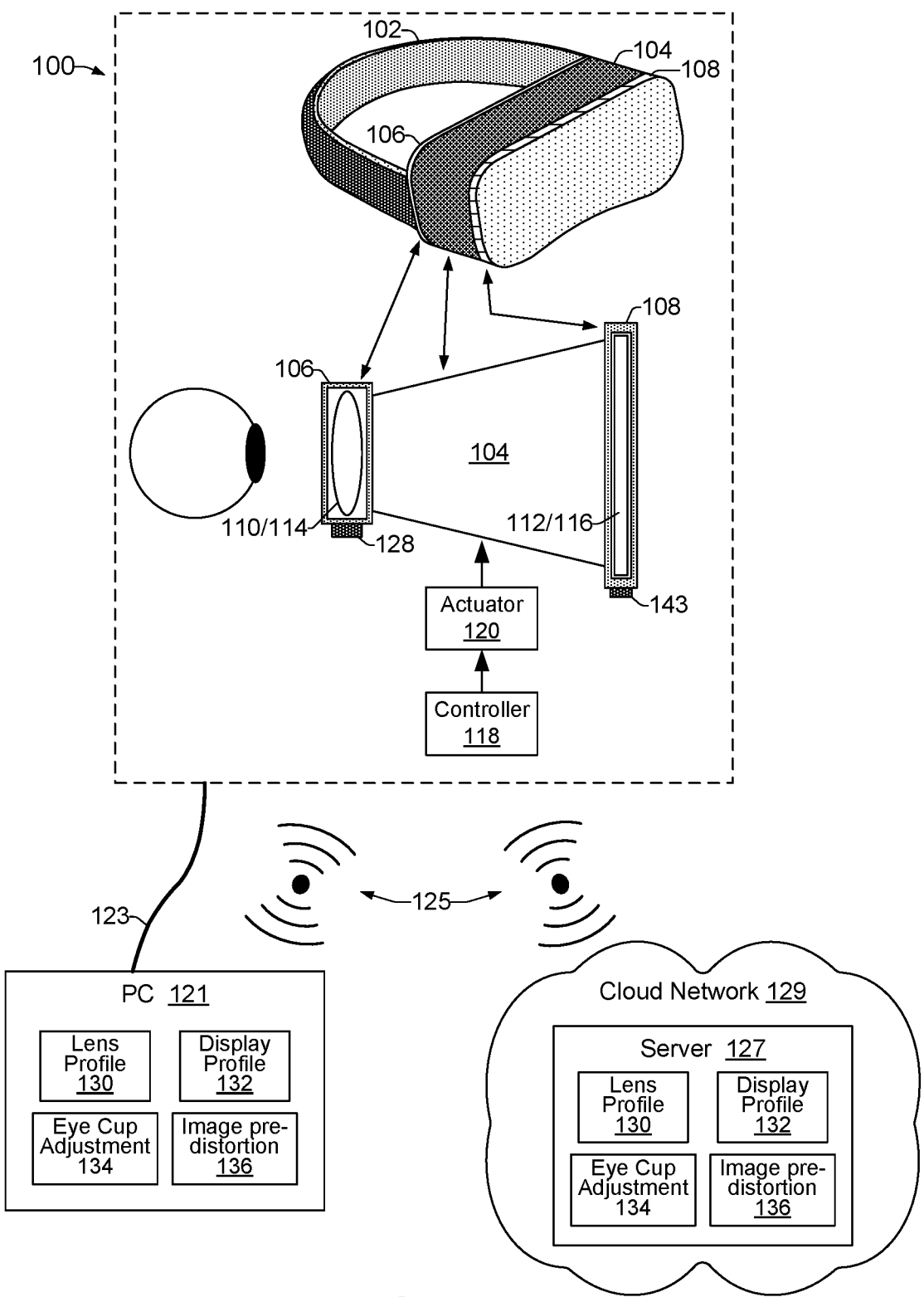
FIG. 1B shows an example HMD device in different configurations in which image processing can occur on a remote device.

In other examples however, an HMD device 100 may not be configured as an "all-in-one" device, but instead may be configured so that some or all of the image processing can be performed on a remote device prior to images being displayed on the HMD device 100. FIG. 1B shows an example HMD device 100 that illustrates a number of different configurations in which image processing and other processing (eye cup adjustments implementing instructions from module 134) can occur on a device that is remote from the HMD device 100. As shown in FIG. 1B, in some examples an HMD device 100 can be coupled to a remote PC 121 or other processing device through a tethered or wired connection 123, such as through an HDMI cable. In some examples, as shown in FIG. 1B, an HMD device 100 can be coupled to a remote PC 121 or other processing device through a wireless connection 125. A wireless connection 125 can include any suitable wireless communication protocol such as Bluetooth™, ZigBee™, ZWave™, and the like. In some examples, as shown in FIG. 1B, an HMD device 100 can be coupled to a remote computing device such as a server 127 in a cloud network 129. Cloud network 129 can represent any of a variety of network topologies and types (including optical, wired and/or wireless networks), employing any of a variety of network protocols (including public and/or proprietary protocols). Thus, a cloud network 129 may include, for example, a home network, a corporate network, and the Internet, as well as one or multiple local area networks (LANs) and/or wide area networks (WANs) and combinations thereof. In examples such as those shown in FIG. 1B, processing components including lens profile 130, display profile 132, eye cup adjustment instruction module 134, and image pre-distortion instruction module 136 can be implemented on remote computing devices to provide image processing for an example HMD device 100 in the same or similar manner as described herein with respect to the "all-in-one" HMD device shown in FIG. 1A.

Figure 2:
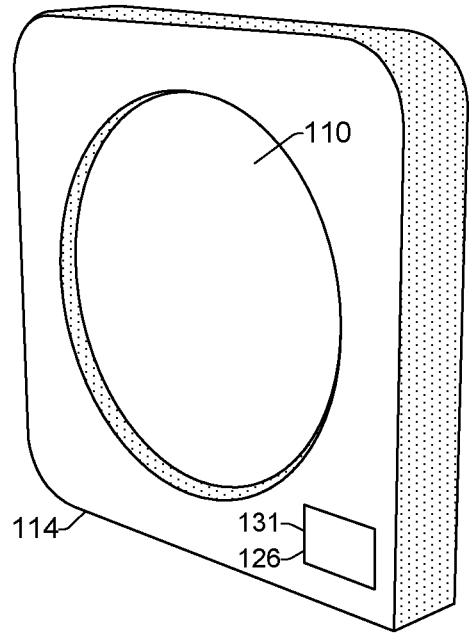
FIG. 2 shows an example of an interchangeable lens integrated into a lens module.
Figure 3:
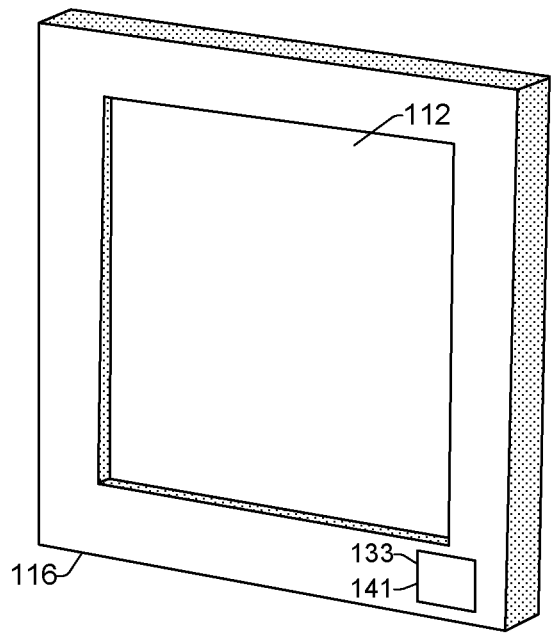
FIG. 3 shows an example of an electronic display integrated into a display module.
Figure 4A:
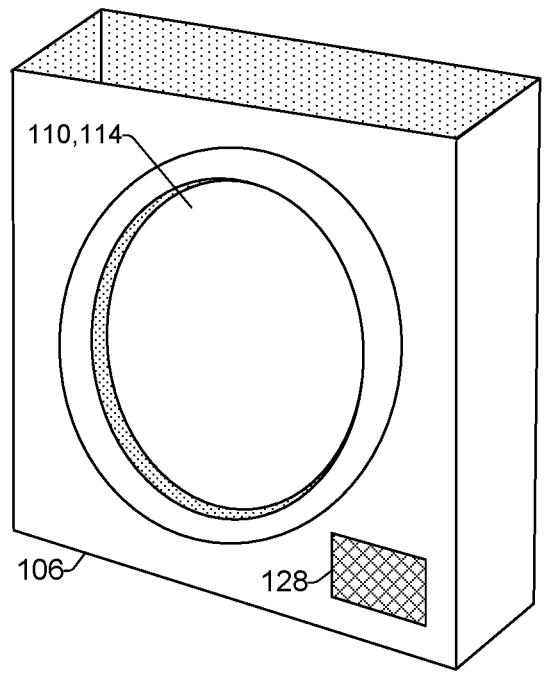
FIG. 4A shows an example of a lens receptacle with a lens and lens module inserted into the receptacle.
Figure 4B:
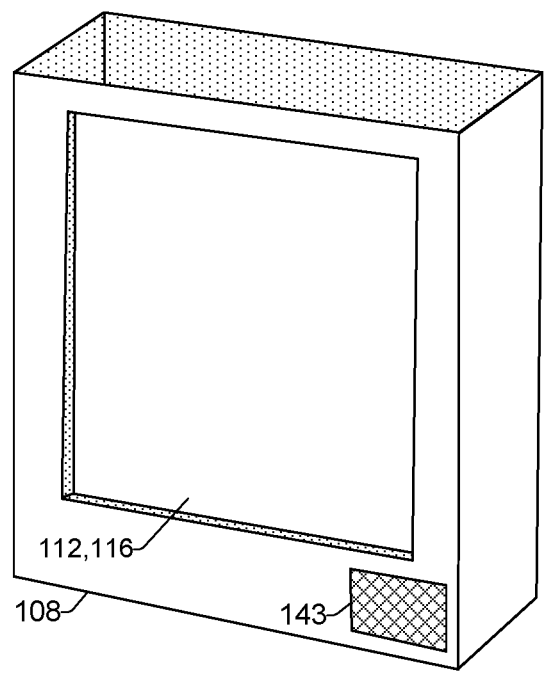
FIG. 4B shows an example of a display receptacle with a display and display module inserted into the receptacle.

FIG. 2 shows an example of an interchangeable lens 110 integrated into a lens module 114. FIG. 3 shows an example of an electronic display 112 integrated into a display module 116. As noted above, the modules 114 and 116 comprise a form factor that facilitates their insertion and extraction with different lenses 110 and displays 112 into HMD device receptacles 106 and 108. FIGS. 4A and 4B show examples of HMD device receptacles 106 and 108, respectively. Specifically, FIG. 4A shows an example of a lens receptacle 106 with a lens 110 and lens module 114 inserted into the receptacle 106, and FIG. 4B shows an example of a display receptacle 108 with a display 112 and display module 116 inserted into the receptacle 108.

Referring now generally to FIGS. 1A, 1B, 2, 3, 4A, and 4B, an interchangeable lens 110 can include any of a variety of different types of lenses that have associated lens calibration profiles. Therefore, an interchangeable lens 110 can include a lens with a different focal length and/or different optical center, a prescription lens to address problems such as astigmatism, myopia or hyperopia, a lens made from different materials including glass, plastic, and other materials, a Fresnel lens, a lens stack, and so on. In general, appropriate interchangeable lenses provided by different manufacturers can have varying levels of optical quality based on levels of refined materials, chemicals, and processes used to manufacture the lenses. A lens calibration profile 130 associated with such interchangeable lenses 110 enables the HMD device controller 118 (discussed below) to provide appropriate pre-distortions to images.

An interchangeable display 112 can include different types of display panels such as OLED display panels or LCD display panels. Displays can have different display screen characteristics such as the display resolution, the refresh rate, the contrast ratio, and the brightness level. Similar to the lens profile 130 discussed above, an interchangeable display 112 can include an associated display profile 132 that enables the HMD device controller 118 to provide appropriate image calibrations to help optimize images based on the display characteristics.

A lens module 114 can store lens information 126 that is readable by a reader 128 or sensor 128 on the HMD device 100 or on the lens receptacle 106 in the device 100. Similarly, a display module 116 can store display information 141 that is readable by a reader/sensor 143. Lens and display information 126, 141 can be stored on modules 114, 116 using various types of storage devices 131, 133, including, for example, an RFID tag or microchip, a QR code, an IR code, or an onboard memory accessible by electrical connections. Such electrical connections can include, for example, multiple electrical connectors to make contact with corresponding connections on a PC board or set of conductors on the lens module 114. In some examples, such connections can be pre-wired, pre-routed, or otherwise configured to provide short or open electrical connections that can identify the lens without the involvement of active electronics or a power source. Thus, in different examples the readers 128 and 143 can comprise an RFID reader, a QR code reader, an IR reader, or the controller 118 that reads a memory 131, 133 onboard the modules 114, 116 when the modules are inserted into the receptacles 106, 108.

Figure 5:
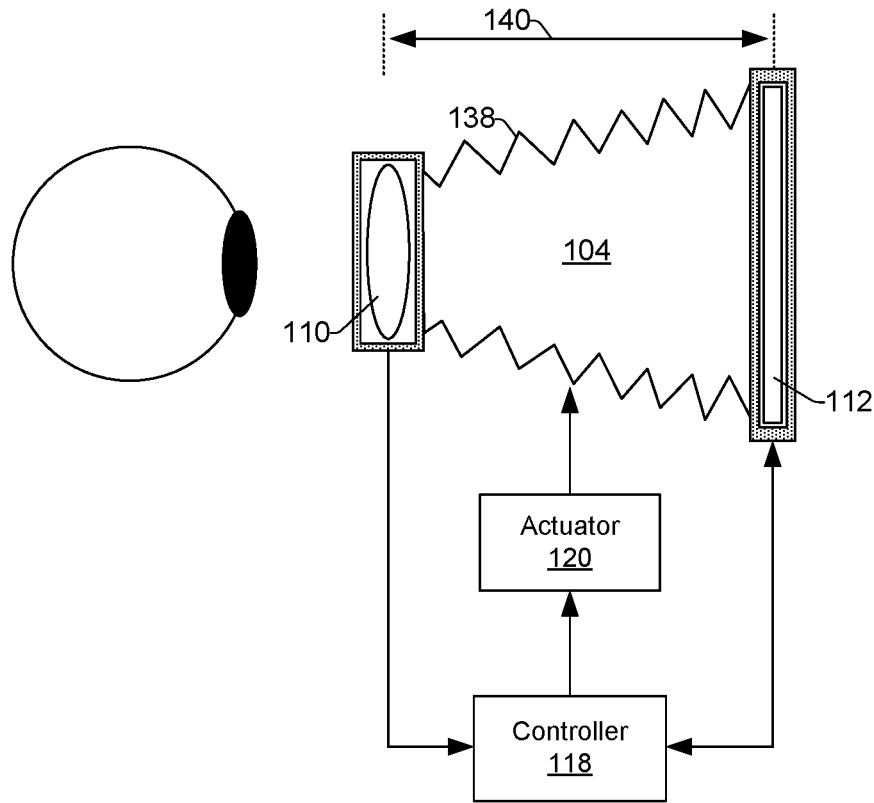
FIG. 5 shows an example eye cup formed from a flexible material to accommodate mechanical adjustments that can expand and contract the size of the eye cup.

Lens information 126 can include lens identification information that identifies the lens type (e.g., lens focal length), as well as the manufacturer, model, materials, manufacturing processes, and so on. When the lens module 114 is inserted into the lens receptacle 106 of HMD device 100, the controller 118 can access the lens information 126 from storage 131 through the reader 128. Using lens information 126, the controller 118 can access the lens focal length and other lens characteristics. In some examples, controller 118 can execute instructions from an eye cup adjustment instruction module 134 stored in memory 124 in order to determine an amount of mechanical adjustment to apply to the eye cup 104 to optimize the field of view for the inserted lens. FIG. 5 shows an example eye cup 104 formed from a flexible material 138 (e.g., accordion style material) to accommodate such mechanical adjustments that can expand and contract the size of the eye cup 104, varying the distance 140 between the lens 110 and display 112. Controller 118 can control mechanical actuator 120 to adjust the geometry of the eye cup 104. In some examples, other geometries of the eye cup 104 can also be adjusted, such as the size of the eye cup opening.

In some examples, the controller 118 or other local or remote processing device (e.g., FIG. 1B; PC 121, server 127) can also match the lens information 126 with a lens profile 130, and can use the lens profile 130 in an image pre-distortion calibration process (e.g., executing instructions from image pre-distortion instruction module 136) to apply appropriate pre-distortions to images prior to their being displayed on the display. In some examples, a lens profile 130 can be stored in an onboard memory 131 of the lens module 114 and can be accessed by the controller 118 or remote processing device through the reader 128.

Display information 141 can include display identification information that identifies the display type (e.g., OLED, LCD), as well as the manufacturer, model, display resolution, screen refresh rate, contrast ratio, brightness levels, and other characteristics. When a display module 116 is inserted into the display receptacle 108 of HMD device 100, the controller 118 can access the display information 141 from storage 133 through the reader 143. Using the display information 141, the controller 118 can determine a display profile 132 that can be used in an image pre-distortion calibration process (e.g., executing instructions from image pre-distortion instruction module 136) to apply appropriate pre-distortions to images prior to their being displayed on the display. In some examples, a display profile 132 can be stored in an onboard memory 133 of the display module 116 and can be accessed by the controller 118 through the reader 143.

Figure 6:
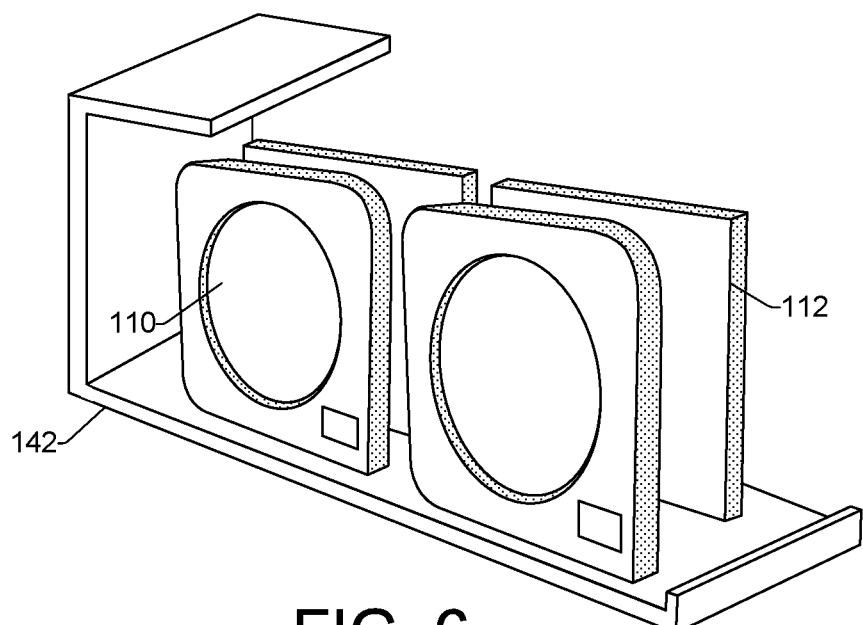
FIG. 6 shows an example of a dual lens and display module that accommodates two lenses and two display panels; and, FIGS. 7, 8A and 8B are flow diagrams showing example methods of operating a head-mounted display (HMD) device.

While example lens and display modules 114 and 116 have been discussed and shown in FIGS. 2 and 3 as being separate modules that each comprise single interchangeable lens 110 and displays 112, respectively, other modular configurations for interchangeable lenses and displays are possible and are contemplated herein. For example, FIG. 6 shows an example of a dual lens and display module 142 that accommodates two lenses and two display panels. In this example, the lens and displays can be in fixed relative positions. However, in other examples such a dual module 142 can comprise expandable and contractible components that enable the distance between the lenses and displays to be varied in a manner similar to that discussed above with regard to FIG. 3.

Figure 7:
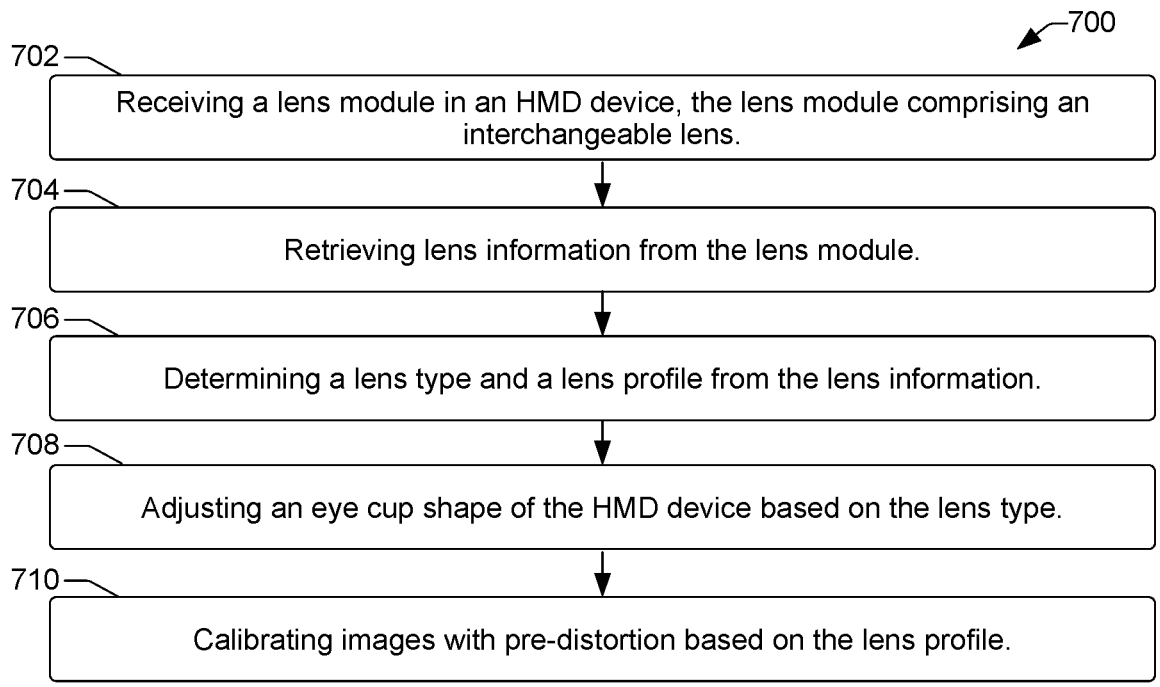
Figure 8A:
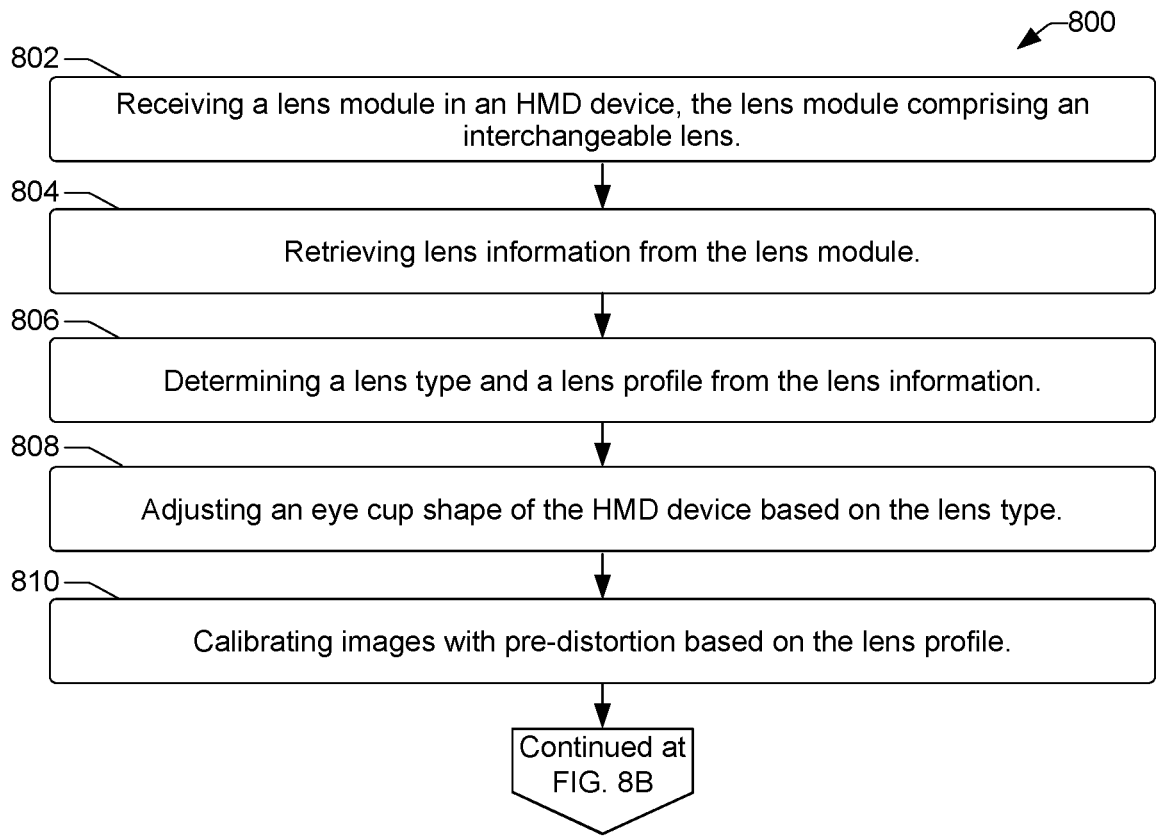
Figure 8B:
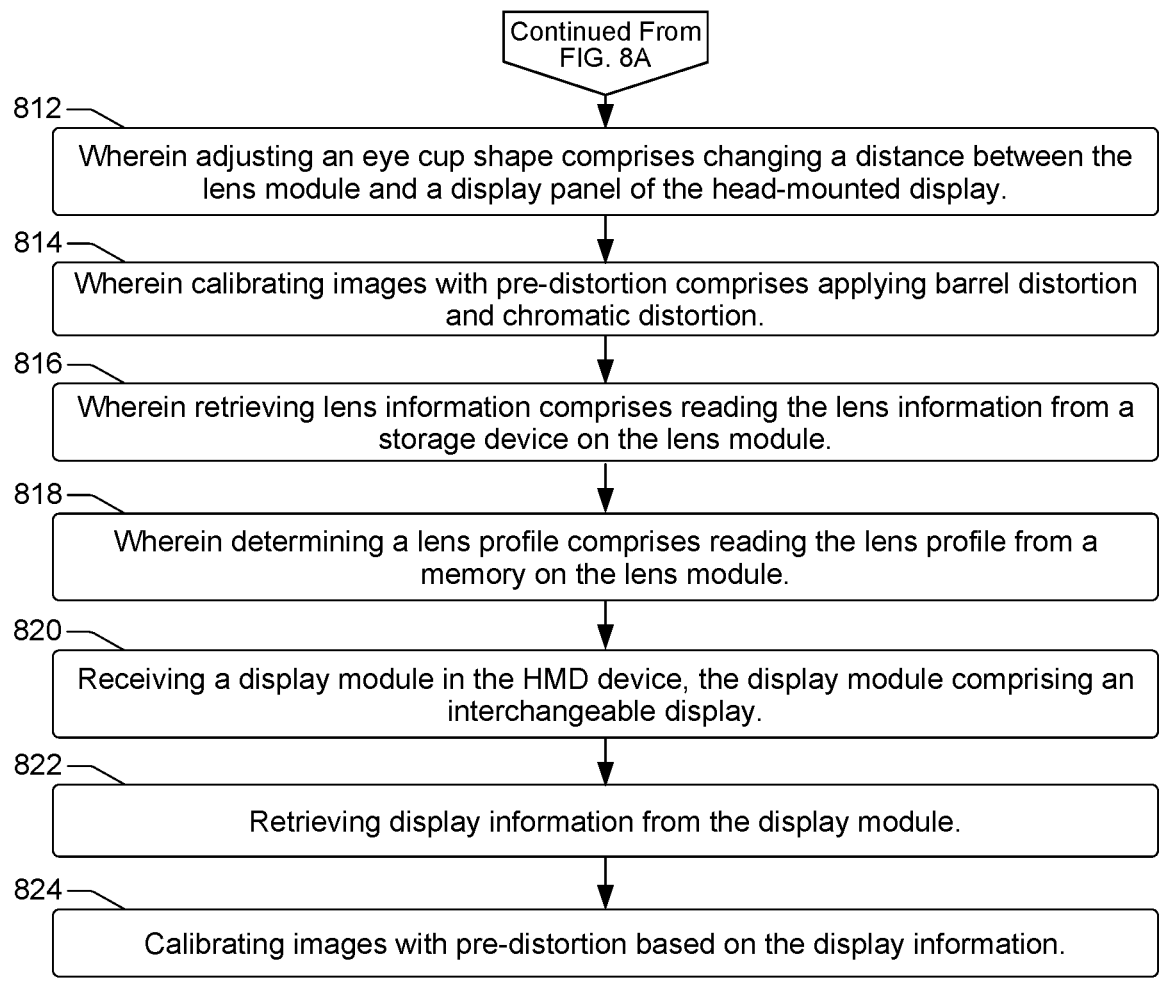

FIGS. 7 and 8 (i.e., FIGS. 8A and 8B) are flow diagrams showing example methods 700 and 800 of operating a head-mounted display (HMD) device. Method 800 comprises extensions of method 700 and incorporates additional details of method 700. Methods 700 and 800 are associated with examples discussed above with regard to FIGS. 1A, 1B-6, and details of the operations shown in methods 700 and 800 can be found in the related discussion of such examples. The operations of methods 700 and 800 may be embodied as programming instructions stored on a non-transitory, machine-readable (e.g., computer/processor-readable) medium, such as memory/storage 124 shown in FIG. 1A. In some examples, implementing the operations of methods 700 and 800 can be achieved by a controller with a processor, such as a controller 118 with a processor 122 of FIG. 1A, reading and executing programming instructions stored in a memory 124. In some examples, implementing the operations of methods 700 and 800 can be achieved using an ASIC and/or other hardware components alone or in combination with programming instructions executable by a processor 122.

The methods 700 and 800 may include more than one implementation, and different implementations of methods 700 and 800 may not employ every operation presented in the respective flow diagrams of FIGS. 7 and 8. Therefore, while the operations of methods 700 and 800 are presented in a particular order within their respective flow diagrams, the order of their presentations is not intended to be a limitation as to the order in which the operations may actually be implemented, or as to whether all of the operations may be implemented. For example, one implementation of method 800 might be achieved through the performance of a number of initial operations, without performing other subsequent operations, while another implementation of method 800 might be achieved through the performance of all of the operations.

Referring now to the flow diagram of FIG. 7, an example method 700 of operating a head-mounted display (HMD) device begins at block 702 with receiving a lens module in the HMD device, where the lens module comprises an interchangeable lens. The method can continue with retrieving lens information from the lens module (block 704), and determining a lens type and a lens profile from the lens information (block 706). The method can further include adjusting an eye cup shape of the HMD device based on the lens type (block 708), and calibrating images with pre-distortion based on the lens profile (block 710).

Referring now to the flow diagram of FIG. 8 (i.e., FIGS. 8A, 8B), another example method 800 of operating a head-mounted display (HMD) device is shown. Method 800 comprises extensions of method 700 and incorporates additional details of method 700. Accordingly, method 800 begins at block 802 with receiving a lens module in the HMD device, where the lens module comprises an interchangeable lens. The method can continue with retrieving lens information from the lens module (block 804), determining a lens type and a lens profile from the lens information (block 806), adjusting an eye cup shape of the HMD device based on the lens type (block 808), and calibrating images with pre-distortion based on the lens profile (block 810).

The method 800 at FIG. 8A continues at FIG. 8B. In some examples of method 800, adjusting an eye cup shape can include changing a distance between the lens module and a display panel of the head-mounted display, and/or changing the size of the eye cup opening (block 812). In some examples, calibrating images with pre-distortion can include applying barrel distortion and chromatic distortion to the images (block 814). In some examples, retrieving lens information from the lens module can include reading the lens information from a storage device on the lens module (block 816). In some examples, determining a lens profile can include reading the lens profile from a memory on the lens module (block 818). The method can also include receiving a display module in the HMD device, where the display module includes an interchangeable display (block 820). In some examples the method can also include retrieving display information from the display module (block 822), and calibrating images with pre-distortion based on the display information (block 824).

What is claimed is:

1. A head-mounted display (HMD) device comprising:
a display;
a variable lens receptacle to receive an interchangeable lens;
a sensor to retrieve lens information from the lens;
an eye cup;
an actuator to vary a shape of the eye cup based on the lens information; and
a controller to obtain images that are pre-distorted according to the lens information, the controller to display the pre-distorted images on the display.

2. A HMD device as in claim 1, wherein:
the lens information comprises a lens calibration profile; and,
obtaining the pre-distorted images comprises the controller applying image pre-distortions based on the lens calibration profile prior to displaying the pre-distorted images on the display.

3. A HMD device as in claim 1, further comprising:
the eye cup comprising a flexible material to enable adjustment to the eye cup shape, the eye cup comprising first and second opposing ends with the lens receptacle positioned at the first end and the display positioned at the second end; and
wherein the controller is to determine a lens type from the lens information, and to control the actuator to adjust the shape of the eye cup based on the lens type.

4. A HMD device as in claim 1, wherein the sensor is selected from an RFID reader, a QR code reader, an IR transceiver, and an electrical connection to a memory onboard the lens.

5. A HMD device as in claim 1, wherein the display comprises an interchangeable display, the HMD device further comprising:
 a variable display receptacle to receive interchangeable displays;
 a sensor on the variable display receptacle to retrieve display information from an interchangeable display inserted into the variable display receptacle; and,
 wherein the controller is to determine a display profile from the display information and to apply pre-distortions to the images based on the display profile prior to sending the images to the interchangeable display.

6. A HMD device as in claim 1, wherein the controller is to match the lens information to a lens profile stored on a server and accessed through a cloud network.

7. A HMD device as in claim 1, wherein the variable lens receptacle is to receive two interchangeable lenses.

8. A method of operating a head-mounted display (HMD) device comprising:
 receiving a lens module in the HMD device, the lens module comprising an interchangeable lens;
 retrieving lens information from the lens module;
 determining a lens type and a lens profile from the lens information;
 adjusting an eye cup shape of the HMD device based on the lens type; and,
 calibrating images with pre-distortion based on the lens profile.

9. A method as in claim 8, wherein adjusting an eye cup shape comprises changing a distance between the lens module and a display panel of the head-mounted display.

10. A method as in claim 8, wherein calibrating images with pre-distortion comprises applying barrel distortion and chromatic distortion to the images.

11. A method as in claim 8, wherein retrieving lens information from the lens module comprises reading the lens information from a storage device on the lens module.

12. A method as in claim 8 wherein determining a lens profile comprises reading the lens profile from a memory on the lens module.

13. A method as in claim 8, further comprising:
 receiving a display module in the HMD device, the display module comprising an interchangeable display;
 retrieving display information from the display module; and,
 calibrating images with pre-distortion based on the display information.

14. A method as in claim 9, wherein adjusting the eye cup shape comprises controlling an actuator to adjust a distance between the lens module and a display panel of the head-mounted display.

15. A method as in claim 8 wherein determining a lens profile comprises reading the lens profile from a memory on a server in a cloud network.

16. A head-mounted display (HMD) device comprising:
 a lens receptacle to receive a self-identifying, interchangeable lens module;
 a reading device to retrieve lens identification information stored on the lens module when the lens module is inserted into the lens receptacle;
 an eye cup;
 an actuator to adjust a shape of the eye cup based on the lens identification information; and
 a controller to calibrate the HMD device based on the lens identification information.

17. A HMD device as in claim 16, further comprising:
 the eye cup formed of a flexible material; and
 the actuator controlled by the controller to adjust the shape of the eye cup.

18. A HMD device as in claim 16, wherein the lens identification information comprises a lens calibration profile, and the controller calibrating the HMD device comprises pre-distorting images based on the lens calibration profile prior to sending the images to a display.

19. A HMD device as in claim 16, further comprising:
 a display receptacle to receive a self-identifying, interchangeable display module;
 a second reading device on the display receptacle to retrieve display identification information stored on the display module when the display module is inserted into the display receptacle; and,
 wherein the controller is to further calibrate the HMD device based on the display identification information.

20. A HMD device as in claim 16, wherein the controller is to match the lens identification information to a lens profile stored on one of:
 memory of the controller,
 a remote processing device, and
 a remote server accessed through a cloud network; and
 calibrate the HMD device based on the lens profile.

* * * * *